April 1, 1924.  1,489,206
G. G. GREENE
CASTER FOR WOOD FURNITURE
Filed Jan. 23, 1922
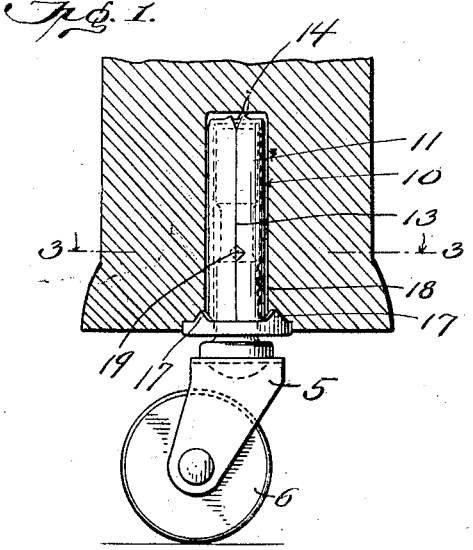
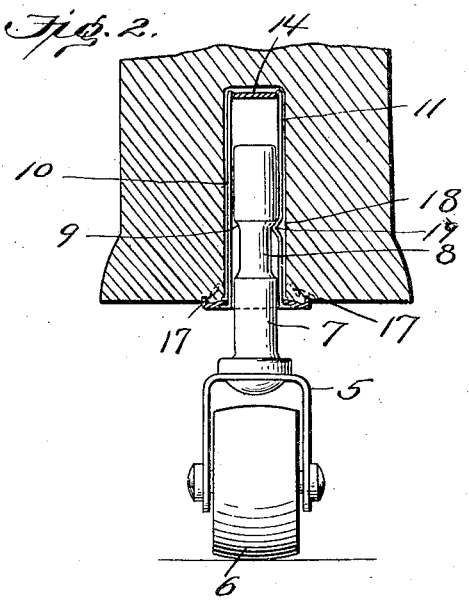
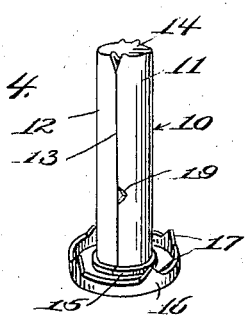
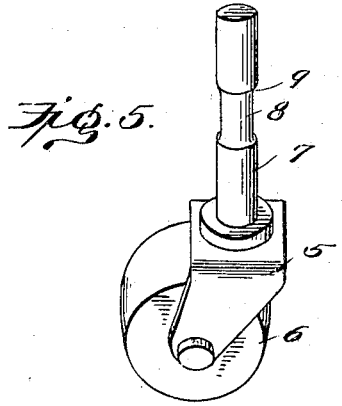
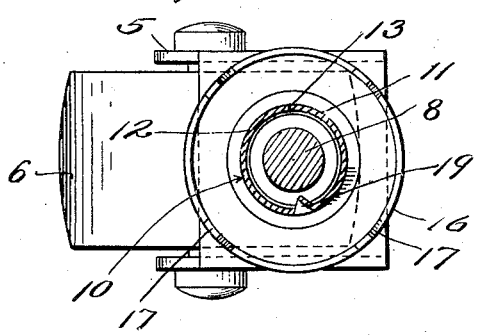
Inventor
Glenn G. Greene
By
Attorney Patented Apr. 1, 1924.

1,489,206

UNITED STATES PATENT OFFICE.

GLENN G. GREENE, OF WARREN, PENNSYLVANIA, ASSIGNOR TO G. G. G. METAL STAMPING COMPANY, OF WARREN, PENNSYLVANIA, A CORPORATION OF PENNSYLVANIA.

CASTER FOR WOOD FURNITURE.

Application filed January 23, 1922. Serial No. 531,239.

*To all whom it may concern:*

Be it known that I, GLENN G. GREENE, a citizen of the United States, residing at Warren, in the county of Warren and State of Pennsylvania, have invented new and useful Improvements in Casters for Wood Furniture, of which the following is a specification.

This invention relates to improvements in casters for furniture and particularly to the holding means applied to furniture legs or to frame structures admitting the association of a caster therewith for retaining the roller and its stem or pintle in operative position.

An object of the invention is to provide holding means for the stem of the roller of such structure that sufficient play or fulcruming action of the stem or pintle will be permitted, the pintle or stem being readily detachable and attachable relatively to the mount or holding means for convenience in transportation or storage and operative association of the parts of the caster with a furniture leg or other structure to which the improved caster may be applied.

Heretofore a caster mount or holding means in the form of a socket has been constructed with indentations to cooperate with a tapered reduction of the caster stem or pintle. These indentations in the prior caster mount or socket were disposed in such positions relatively to the seams of the mount or socket sections that when the socket was inserted in a furniture leg or other structure and the stem or pintle pushed thereinto, said indentations would straighten out or be reduced and provide little or no retention function relatively to the stem or pintle, owing to the fact that there was not sufficient spring action to cause the indentations to assume their normal inward projection after the stem or pintle was pushed or driven into place in the mount or socket. In the present improved construction an indentation is formed at the one seam of the mount or socket member or section, to give the said indentation a greater resiliency or flexibility, so that when the mount or socket is driven into the wood, there will be no tendency of the indentation to straighten out, and as a consequence, in the improved structure when the stem or pintle is inserted in the mount or socket, it will be retained in operative position but with the necessary freedom of movement required in a practically operating caster structure. The present improvement also minimizes the number of structural parts and also simplifies the latter, and therefore provides a complete caster structure which can be readily and economically manufactured and applied.

The invention is described in connection with the accompanying drawings illustrative of the preferred form of the improvement.

In the drawings:

Fig. 1 is a sectional view through a portion of a furniture leg, showing the improved caster applied thereto and illustrated in elevation, portions of the improved device being shown in dotted lines;

Fig. 2 also shows a section through a portion of a furniture leg and the improved caster mount or socket and showing the caster in planes at right angles to that illustrated by Fig. 1;

Fig. 3 is a horizontal section on the line 3—3, Fig. 1;

Fig. 4 is a detail perspective view of the improved caster mount or socket; and

Fig. 5 is a detail perspective view of the caster roller and usual frame or yoke and stem or pintle, showing part of the features of the improvement.

The numeral 5 designates a caster frame or yoke of the ordinary construction having a roller 6 mounted to freely rotate therein and a vertical stem or pintle 7, which in the present instance is formed with an intermediate reduced member 8, provided by circumferentially grooving the stem or pintle. The surface of the grooved portion or reduced member 8 of the stem or pintle gradually merges in an outwardly curved contour 9 into the straight cylindrical portions of the stem or pintle above and below the reduction. The remaining part of the improved caster consists of a socket 10 made up of sections 11 and 12 joined by seams 13, the upper end 14 of the socket being closed as usual, and the lower end having a collar 15 with an upstanding peripheral flange 16 provided with spurs 17 at intervals which are adapted to be driven into the wood of the furniture leg or other structure to which the caster is applied, as clearly shown by Figs. 1 and 2, and whereby the caster mount or socket 10 will be immovably retained in place in a bore or seat 18 formed in the furniture leg or other structure. An indentation 19 is formed in the socket 10 and located at one of the seams 13. By locating the indentation 19 at the seam 13, a greater resiliency or flexibility of the indentation results, with material advantages in the assemblage of each socket with the furniture leg or other structure and the preservation of the desired normal inward projection of the indentation after the socket has been fully applied. The requisite resiliency or flexibility which is necessary to retain the indentation in its primary shape after the socket has been driven home in its bore or seat, is due to the location of the said indentation at or near the seam 13, and whereby the socket as a whole will give sufficiently to permit it to be positively applied without causing the indentation to spring or straighten out, as would be the case if it was located at an intermediate point in the socket sections, or at a distance from the seam, and where they would have no ease-off or yielding action as in the improved structure. The indentation 19 constructed as specified together with the location and form of the intermediate reduced part or elongated seat groove 8 of the stem or pintle 7 combine in effecting a reliable assemblage of the stem or pintle and socket with ample practical play of the stem or socket both vertically and rotatably.

After the socket 10 has been fully applied to a furniture leg or other structure as shown by Figs. 1 and 2, the stem or pintle 7 with the frame 5 and roller 6 is associated with the socket by forcing the said stem or pintle into the socket until the indentations engage the intermediate part of the stem or pintle where the reduced part or seat groove 8 is formed. The indentation 19 has an inward projection sufficient to retain the stem or pintle 7 in the socket 10 without causing any frictional engagement or binding on the surface of the reduced part 8, and in fact the maximum inwardly projecting part of the indentation is always clear of the surface of the reduced part 8.

It is obvious that changes in the proportions, dimensions and minor details of construction may be adopted without departing from the spirit and scope of the invention as expressed in the appended claims.

What is claimed as new is:

1. A caster of the class specified, comprising a socket formed of yielding sheet metal and having continuous seam edges and a closed top, a part of one seam edge being triangularly indented at a point below the upper and lower ends of the socket and the base of the triangular indentation being parallel with the seam edge, the indentation being formed without cutting the material of the socket, and a roller and frame having a pintle with an intermediate circumferentially reduced grooved portion providing a longitudinally extended recess in central relation to the pintle and permitting the latter to have vertical movement within the socket but preventing accidental separation of the pintle from the socket.

2. A caster of the class specified, having a socket composed of yielding sheet metal with opposite seams extending from the top to the bottom thereof, the contiguous edges of the seams being free and one edge of one seam angularly indented wholly to one side of the adjacent seam edge to provide a resilient inwardly extending uncut projection that normally lies within the socket and presents upper and lower angular surfaces within the socket, and a pintle having a roller associated therewith, the pintle being formed between its upper and lower terminals with a circumferential groove of equal diameter throughout its length and located at a central point relatively to the upper and lower ends of the pintle and into which the said uncut resilient projection of the socket extends when the pintle is inserted in the socket, the recess engaged by the projection permitting the pintle to have vertical movement but preventing accidental separation of the pintle from the socket.

In testimony whereof I have hereunto set my hand in presence of two subscribing witnesses.

GLENN G. GREENE.

Witnesses:
A. M. MEAD,
A. M. HULING.